No. 786,815. PATENTED APR. 11, 1905.
J. P. HUTCHISON.
STEAM COOKING AND WATER HEATING ATTACHMENT FOR COOKING STOVES.
APPLICATION FILED MAY 5, 1903.

Witnesses:
Homer R. Hutchison
Laura A. Hutchison

Inventor:
James P. Hutchison

No. 786,815. Patented April 11, 1905.

UNITED STATES PATENT OFFICE.

JAMES P. HUTCHISON, OF ELLSWORTH, OHIO.

STEAM COOKING AND WATER-HEATING ATTACHMENT FOR COOKING-STOVES.

SPECIFICATION forming part of Letters Patent No. 786,815, dated April 11, 1905.

Application filed May 5, 1903. Serial No. 155,782.

*To all whom it may concern:*

Be it known that I, JAMES P. HUTCHISON, a citizen of the United States, residing at Ellsworth, in the county of Mahoning and State of Ohio, have invented a new and useful Steam Cooking and Water-Heating Attachment for Cooking-Stoves, of which the following is a specification.

My invention relates to improvements in steam cooking and water-heating attachments for cooking-stoves; and the object of my invention is to supply heated water either to a steam cooking-chamber or to a water-tank. I attain this object by the construction and arrangement of parts hereinafter described, and particularly pointed out in the appended claim.

Figure 1:
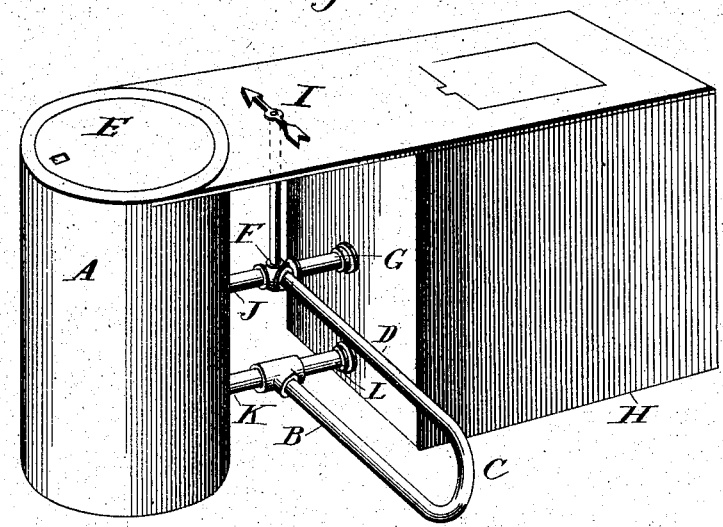
Figure 2:
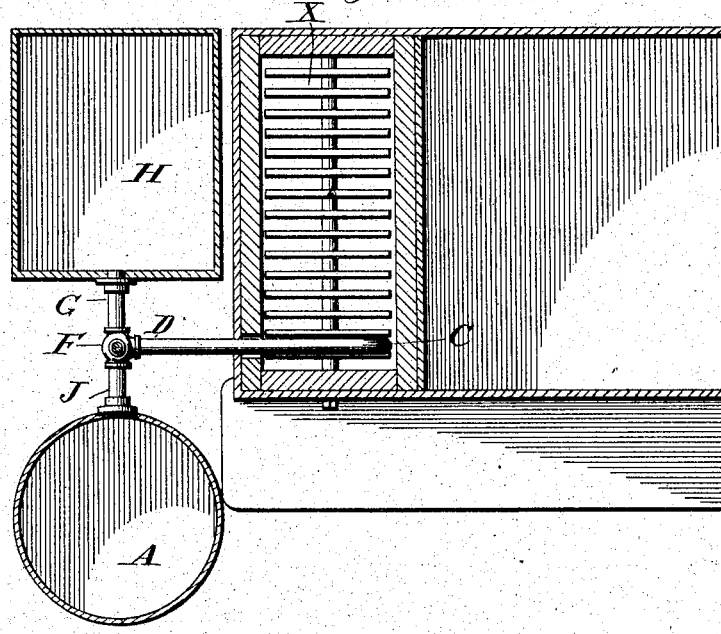

Referring to the accompanying drawings, Figure 1 is a perspective view of my invention. Fig. 2 is a horizontal section of the same, showing its relation to a cooking-stove.

The invention comprises a steam cooking-chamber A, provided with a suitable cover E; a tank H, provided with a suitable cover M; a water-heating loop C; pipes J K, providing communication between the ends of said loop and steam cooking-chamber A; pipes G L, providing communication between the ends of said loop and water-tank H, and a three-way valve F, situated at the intersection of the upper portion of loop C and pipes G J, said three-way valve provided with a suitable handle I.

The steam cooking-chamber A and water-tank H are preferably situated at the end of an ordinary cooking-stove X next to the fire-box, and the loop C is adapted to pass through the end of the cooking-stove and to rest within the fire-box.

Pipes G J are situated above pipes K L, so that when heat is applied to loop C there is a circulation from the lower portion of either the steam cooking-chamber or the water-tank, according to the position of the three-way valve F to the upper portion thereof, so that the heat of the cooking-stove may be utilized by my attachment for the purpose of steam cooking or for heating water for domestic use.

What I claim as my invention, and desire to secure by Letters Patent, is—

In a steam cooking and water-heating attachment for cooking-stoves, the combination of a steam cooking-chamber, a water-tank, a water-heating loop, pipes for providing communication between the ends of said loop and said steam cooking-chamber, pipes for providing communication between the ends of said loop and said water-tank, and means for directing the heated water from the water-heating loop to the steam cooking-chamber or to the tank.

In testimony whereof I have signed my name to this specification in the presence of two subscribing witnesses.

JAMES P. HUTCHISON.

Witnesses:
HOMER R. HUTCHISON,
LAURA A. HUTCHISON.